United States Patent
Bjorg

(10) Patent No.: US 7,617,300 B2
(45) Date of Patent: Nov. 10, 2009

(54) NODE MATCHING IN A DYNAMIC, DECENTRALIZED ENVIRONMENT

(75) Inventor: Steve G. Bjorg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 920 days.

(21) Appl. No.: 10/799,087

(22) Filed: Mar. 12, 2004

(65) Prior Publication Data
US 2005/0204023 A1 Sep. 15, 2005

(51) Int. Cl.
G06F 15/177 (2006.01)
(52) U.S. Cl. .......................... 709/221; 709/243; 707/3
(58) Field of Classification Search ................. 709/227, 709/252, 209, 205, 204, 206, 226, 221, 243; 707/201, 3; 370/389, 351
See application file for complete search history.

(56) References Cited

U.S. PATENT DOCUMENTS

| 6,628,643 | B1* | 9/2003 | Park et al. ................... 370/351 |
| 7,039,634 | B2* | 5/2006 | Xu et al. ......................... 707/3 |
| 7,117,201 | B2* | 10/2006 | Kuno et al. ..................... 707/3 |
| 7,117,264 | B2* | 10/2006 | Becker et al. ............... 709/227 |
| 7,240,093 | B1* | 7/2007 | Danieli et al. ............... 709/205 |
| 2002/0169846 | A1* | 11/2002 | Chen et al. .................. 709/209 |
| 2002/0184310 | A1* | 12/2002 | Traversat et al. ............ 709/204 |
| 2003/0126299 | A1* | 7/2003 | Shah-Heydari ............. 709/252 |
| 2003/0131129 | A1 | 7/2003 | Becker et al. |
| 2004/0024877 | A1* | 2/2004 | Celle ........................... 709/226 |
| 2004/0153520 | A1* | 8/2004 | Rune et al. .................. 709/206 |
| 2004/0215667 | A1* | 10/2004 | Taylor et al. ................ 707/201 |
| 2005/0025144 | A1* | 2/2005 | O'Mahony ................. 370/389 |
| 2005/0080858 | A1* | 4/2005 | Pessach ....................... 709/206 |

OTHER PUBLICATIONS

Anderson, T.E., et al., "High-Speed Switch Scheduling For Local-Area Networks," *ACM Transactions on Computer Systems* 11(4):319-352, Nov. 1993.

Goldberg, A.V., et al., "Sublinear-Time Parallel Algorithms for Matching and Related Problems," research paper, Computer Science Department, University of Illinois, Urbana, IL., 1993.

Hanckowiak, M., et al., "On the Distributed Complexity of Computing Maximal Matchings," research paper, Adam Mickiewics University, Poland, 2001.

Mariani, R., "Face Learning Using a Sequence of Images," *International Journal of Pattern Recognition an Artificial Intelligence* 14(5):631-647, 2000.

Nestmann, U., "What is a 'Good' Encoding of Guarded Choice?" *BRICS (Basic Research in Computer Science) Report Series*, RS-97-45, Dec. 1997.

Peng, Y., "A Novel Adaptive Power-Aware Routing Protocol for the QoS-Based Multi-Traffic in Moblie Ad Hoc Networks," *Journal of Natural Science Hunan Normal University* 25(2):41-44 (abstract), Jun. 2002.

(Continued)

*Primary Examiner*—Jungwon Chang
(74) *Attorney, Agent, or Firm*—Lee & Hayes, PLLC

(57) ABSTRACT

Computing entities in a dynamic, decentralized computing environment are treated as if these computing entities were nodes in a graph linked by edges so as to match these nodes until no further matches are possible. New nodes may dynamically be introduced into the decentralized computing environment and yet various embodiments of the present invention continue to match nodes while inhibiting deadlocks in the decentralized computing environment.

15 Claims, 15 Drawing Sheets

OTHER PUBLICATIONS

Shen, H.C., et al., "Resource Allocation in a Flexible Manufacturing System by Graph Matching," *Proceedings of the 1991 IEEE International Conference on Robotics and Automation*, Sacramento, California, Apr. 1991, pp. 1315-1320.

Yeung, K.L., et al., "A Wavelength Concentrator for WDMA Networks," *IEEE*, The University of Hong Kong, 1993.

Office Action from the Patent Office of the State Intellectual Property Office of the People's Republic of China, Application No. 200510055100.5 mailed on Apr. 24, 2009, 10 pages.

* cited by examiner

NODE MATCHING IN A DYNAMIC, DECENTRALIZED ENVIRONMENT

FIELD OF THE INVENTION

The present invention relates generally to acts of becoming associated with another, and more particularly, to a method for matching communicable nodes in protein bindings; in social networks; or in a dynamic, decentralized computing environment.

BACKGROUND OF THE INVENTION

Centralized computing architecture continues the fiction that began with mainframe computers in the 1950s that all computation can be wholly accomplished by a single computer system. This architecture assumes that all resources are local to the computer system. All resources are addressed, discovered, loaded, used, and freed (and all are assumed to exist) inside a single computer system. Today and for the foreseeable future, however, resources—and with the popularity of the Internet, user data—are scattered across a multiplicity of computer systems, often in different trust domains, and each with its own security policy. The centralized computing architecture of the past has many problems that continue to the present day. FIG. 1 illustrates some of these problems in greater detail.

A mainframe computer 104 is designed to handle intensive computational tasks. See FIG. 1. Mainframe computers, such as the mainframe computer 104, are characterized by their ability to simultaneously support many users connected to the computer by terminals. The name is derived from "main frame," the cabinet originally used to house the processing unit of such computers. A number of nodes 102A-102D are coupled to the mainframe computer 104. A node is a device, such as client computers 102A-C, a shared printer 102D, or other devices that are connected to a network 100 and are capable of communicating with other network devices. Suppose node 102A wishes to communicate with node 102D and node 102B wishes to communicate with node 102C. Because nodes 102A-102D are all local to the mainframe computer 104, the mainframe computer 104 has a global view over these nodes 102A-102D and is capable of knowing which of these nodes are available for communication. For example, if both nodes 102A, 102D are available, the mainframe computer 104 allows communication to occur between nodes 102A, 102D. Similarly, if nodes 102B, 102C are available, the mainframe computer 104 allows nodes 102B, 102C to communicate with one another. The centralized computing architecture of the mainframe computer 104 permits the entire problem of matching nodes that can communicate with one another to be seen at once, and matchings between communicable nodes can be found in no time at all.

Consider a scenario in which the mainframe computer 104 were to be absent from the network 100. In this case, the problem of matching one node to another node for communication seems insurmountable. All that a node, such as nodes 102A-102D, would see is its immediate neighbors. For example, node 102A may see only node 102B or node 102D, but not node 102C. Suppose that node 102B commits early to node 102A for communication and correspondingly node 102C commits early to node 102D for communication. Because of such early commitments, nodes 102B, 102C do not see each other as a potential match for communication. Suppose further that instead of committing to node 102B by node 102A and node 102C by node 102D, node 102A proceeds to connect with node 102D for communication. A deadly embrace or a deadlock has arisen, which is a situation that occurs when two programs, devices, or nodes (such as nodes 102B, 102C) are each waiting for a response from node 102A, 102D before continuing. Of course, no responses will ever be received from nodes 102A, 102D because nodes 102A, 102D have already connected together for communication to the detriment of nodes 102B, 102C.

The centralized computing architecture impedes the growing decentralized architecture of the Internet, where, as discussed above, user data is scattered across a multiplicity of computer systems. Another problem has to do with the dynamic nature of the decentralized architecture of the Internet. Additional nodes that may come into existence, hence growing the network 100 dynamically. This complicates the ability of the network 100 to match available nodes to one another so that communication can occur between two nodes in the presence of the dynamic introduction of nodes. To avoid deadlock, any node that can be matched should be matched.

In sum, centralized computing architectures do not work well for large-scale computer systems, such as the Internet, that are decentralized. Deadlocks may occur when nodes cannot find other nodes for communication even though they are available and willing to communicate. Without a protocol that can suitably work in a dynamic, decentralized computing environment and coordinate the matching of dynamic, decentralized nodes that allow communication to occur, users may eventually no longer trust the network 100 to provide a desired computing experience, and demand for the network 100 will diminish over time in the marketplace. Thus, what is needed is a matching method and system for communicable nodes in a dynamic, decentralized computing environment while avoiding or reducing the problems discussed above.

SUMMARY OF THE INVENTION

The term "nodes" hereinbelow means the inclusion of points on computer equipment, Web services, protein bindings, social networks, that allow one entity to become associated, permanently or temporarily, with another entity. In accordance with this invention, a system, protocol, and computer-readable medium for matching communicable nodes in a dynamic, decentralized computing environment is provided. The system form of the invention comprises a decentralized computing environment, which includes a number of nodes. Each node in the number of nodes is a neighboring node of other nodes in the number of nodes. Each node is capable of querying the availability of neighboring nodes for a match. The match is formed when a first node queries the availability of a second node and the second node in response queries the availability of the first node.

In accordance with further aspects of this invention, a protocol form of the invention includes a computer-implemented protocol for matching communicable nodes in a dynamic, decentralized computing environment. The protocol comprises inviting nodes to communicate to find a match. The protocol further comprises discovering matching availability of nodes by sending availability messages. The protocol yet further comprises forming a match where upon sending another availability message from a first node to a second node, the second node responds with an answer selected from a group consisting of an availability message and a yes message.

In accordance with further aspects of this invention, a computer-readable medium having computer-executable instructions for performing a method for matching communicable nodes in a dynamic, decentralized computing environment, a protocol comprises inviting nodes to communicate to find a match. The protocol further comprises discovering matching availability of nodes by sending availability messages. The protocol yet further comprises forming a match where upon sending another availability message from a first node to a second node, the second node responds with an answer selected from a group consisting of an availability message and a yes message.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Various embodiments of the present invention treat computing entities in a dynamic, decentralized computing environment as if these computing entities were nodes in a graph linked by edges so as to match these nodes until no further matches are possible. New nodes may dynamically be introduced into the decentralized computing environment and yet various embodiments of the present invention continue to match nodes while inhibiting deadlocks in the decentralized computing environment. Various embodiments of the present invention provide a protocol used by each node to probe neighboring nodes to determine whether a potential match is possible. The centralized computing architecture of the past need not be used in various embodiments of the present invention because each node has the potential on its own to discover nodes that it can match, hence facilitating the decentralized computing architecture, an outstanding example of which is the Internet.

Figure 1:
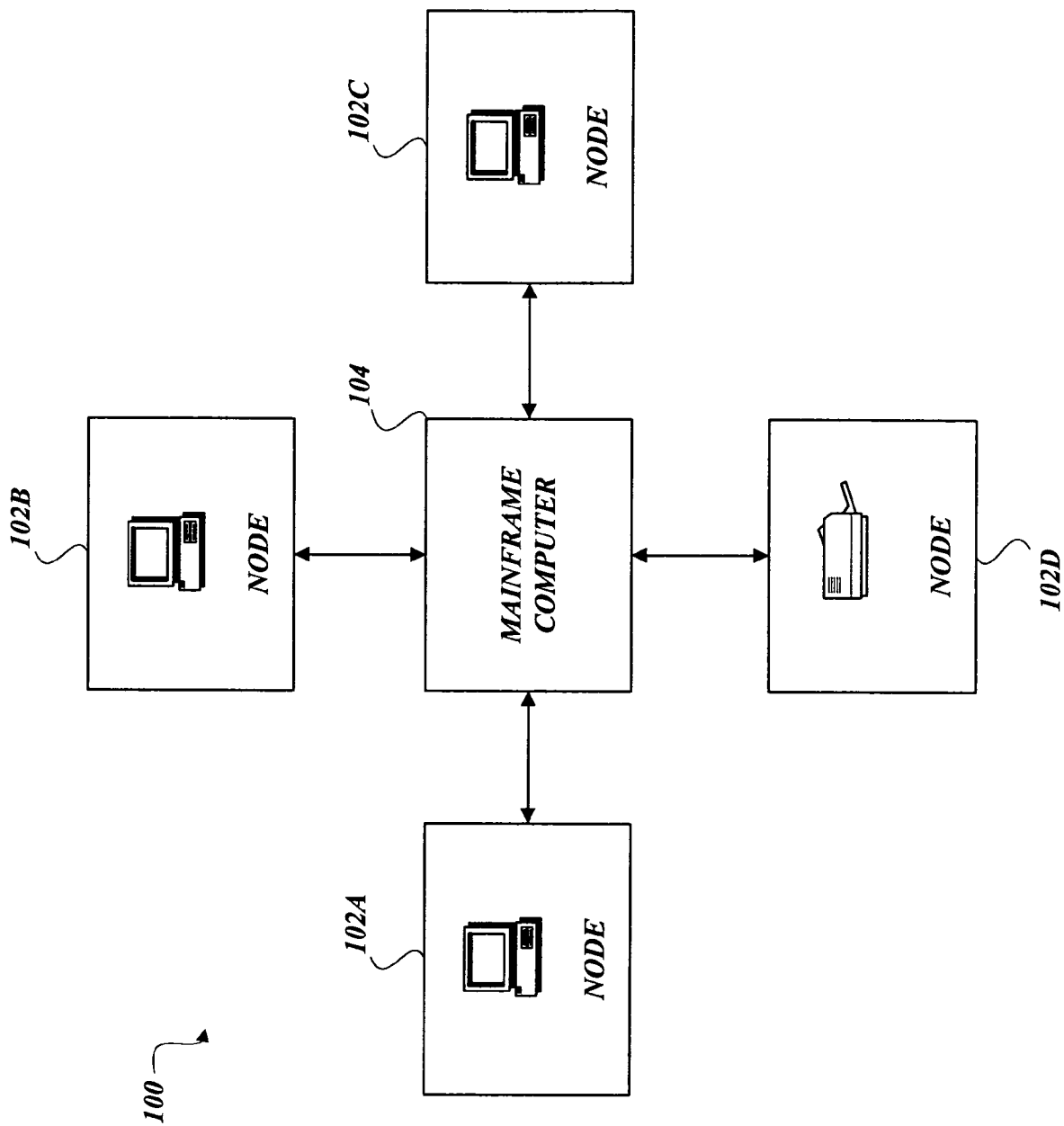
FIG. 1 is a block diagram illustrating a conventional network that comprises a mainframe computer 104 and multiple nodes.
Figure 2:
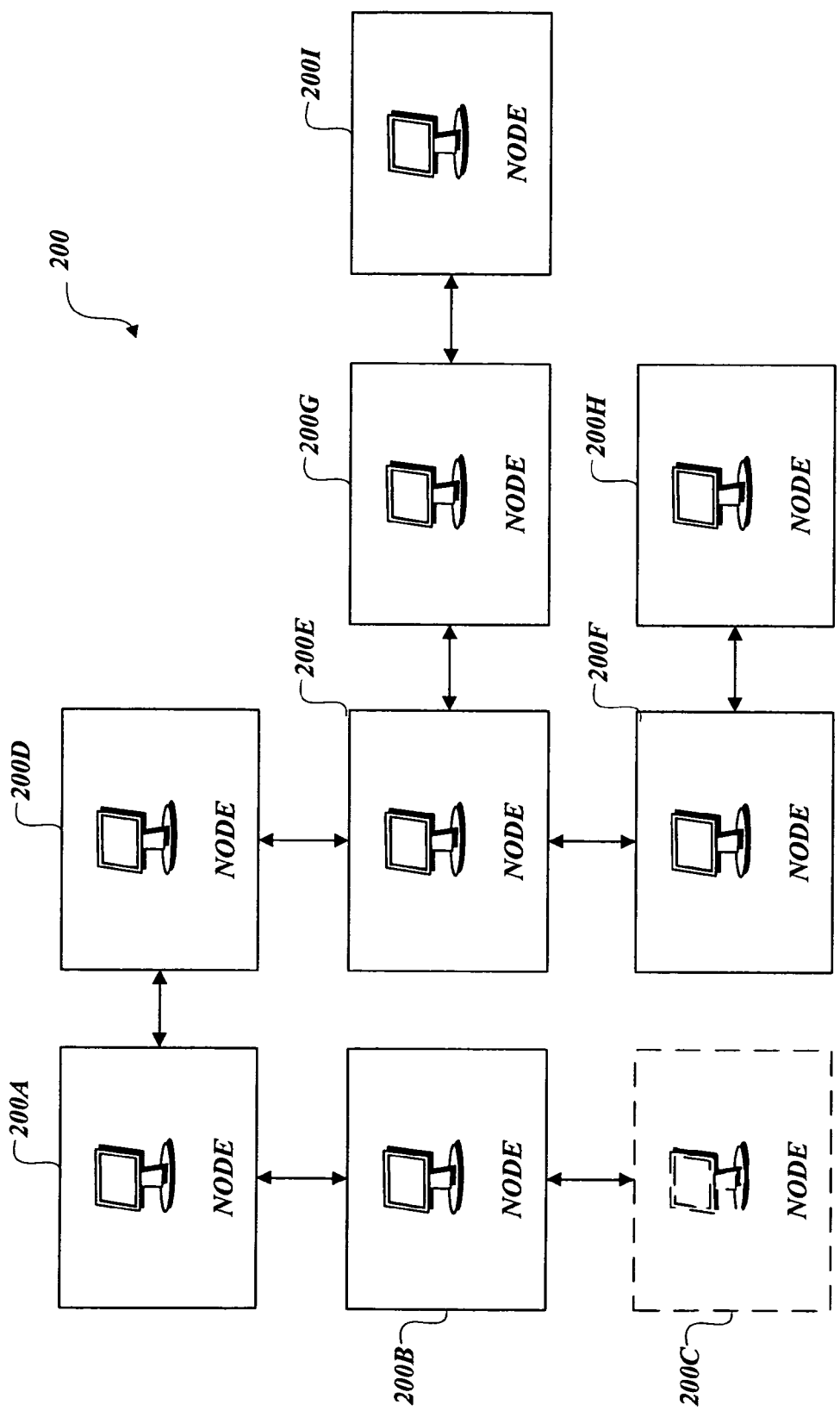
FIG. 2 is a block diagram illustrating multiple nodes attempting to match other nodes for communication, in accordance with one embodiment of the present invention.

A dynamic, decentralized computing environment 200 is illustrated at FIG. 2. The dynamic, decentralized computing environment 200 includes a number of nodes 200A-200I. Each node is a device, such as a client computer, a server, a shared printer, or other computing devices, that is capable of communicating with other nodes. Node 200A is linked to node 200D by an edge, which is illustrated by a line with arrowheads at the termini. Node 200A is linked to node 200B by another edge, illustrated by an arrowhead at one terminus of a line pointing to node 200A and another arrowhead at the other terminus pointing to node 200B. A further edge links node 200B to node 200C where arrowheads at the termini of the line point to both nodes 200B, 200C. Node 200C is visually presented by dashed lines, signifying that node 200C is a new node being introduced to the dynamic, decentralized computing environment 200. The term "dynamic" means the inclusion of the introduction of a node into the dynamic, decentralized computing environment, which did not contain the introduced node at an immediate point in time past. Node 200D is linked to node 200E by an edge whose arrowheads on a line point to nodes 200D, 200E. Node 200E is linked to node 200F by another edge with one arrowhead at one terminus pointing to node 200E and another arrowhead at the remaining terminus pointing to node 200F. An edge links nodes 200F, 200H, which is visually shown by arrowheads on a line pointing to nodes 200F, 200H. Node 200E is linked to node 200G by another edge, presented as a line with arrowheads at its termini. Node 200G, 200I are linked by a line with arrowheads at its termini, which defines an edge.

Nodes 200A-200H and their edges form a graph, which consists of zero or more nodes 200A-200I and zero or more edges, which connect pairs of nodes. A match occurs if there is an edge connecting two free nodes and the two free nodes are willing to commit to each other. To ensure that deadlock is inhibited in the dynamic, decentralized computing environment 200, each free node that wishes to communicate is matched until there are no more edges that can link two free nodes together. The fact that node 200C and other nodes can dynamically appear in the dynamic, decentralized computing environment 200 causes the matching process to be unfinished. If the newly introduced node, such as the node 200C, is linked to another node, such as the node 200B, that has already been matched to node 200A, further matching for node 200C may not be possible. However, if the newly introduced node, such as node 200C, appears as a neighbor to a free node that wishes to communicate with node 200C, a new match may be possible.

One of the challenges of matching nodes in the dynamic, decentralized computing environment 200 is that each node has knowledge of its immediate neighbors, which are linked to the node by edges. For example, node 200A is aware of node 200D and node 200B, but not node 200E. Nodes 200B, 200D are potential matches for node 200A. What is unknown is that node 200D may have been matched to node 200E and node 200B may have been matched to node 200C, rendering nodes 200B, 200D unavailable for matching with node 200A for communication. Various embodiments of the present invention provide a set of rules or standards designed to enable nodes to connect with one another and to exchange information while avoiding or reducing deadlocks in the dynamic, decentralized computing environment 200. Each of nodes 200A-200I is executing potentially at the same time and running the same protocol. The matching method begins with the decision by a node to associate with a neighbor. Various embodiments of the present invention allow a node to begin a dialog with a neighboring node so as to ascertain whether there is a likelihood of matching.

Consider a situation where node 200A commits to match with node 200D, but node 200D is unable to commit to node 200A because node 200D has already been matched with node 200E. At the same time, node 200B has committed to match with node 200C, but node 200C has already been matched with another node (not shown). In other words, this is a situation where node 200A and node 200B are two nodes adjacent to each other with an edge that cannot be matched because of early commitments by both nodes 200A, 200B. Thus, maximal matching is not possible. Various embodiments of the present invention inhibit such a situation. Various embodiments of the present invention need not lock the graph in order to match nodes. This allows new nodes, such as node 200C, to be introduced into the dynamic, decentralized computing environment 200.

To simplify the discussion of a protocol used by various embodiments of the present invention allowing nodes to negotiate to form matches, only three nodes 302-306 are illustrated in a network 300A. A match occurs when two of nodes 302-306 are committed to one another for communication. Node 302 includes two ports 302Z, 302X, only one of which is available for communication. Mathematically, node 302Z is denoted by the letter Z and node 302X is denoted by the letter X. The phrase "Z+X" denotes that only one port among ports Z, X is available for communication at the node 302. Node 304 includes port 304X and port 304Y. Node 304 can match with another node only through one of the ports 304$\overline{X}$, 304$\overline{Y}$. Mathematically, the port 304$\overline{X}$ is denoted by the letter $\overline{X}$ and the port 304$\overline{Y}$ is denoted by the letter $\overline{Y}$. The mathematical phrase "$\overline{X}+\overline{Y}$" denotes that only one port $\overline{X}$, $\overline{Y}$ is available for matching and communication from node 304. Node 306 includes ports 306Y, 306Z. Mathematically, the port 306Y is denoted by the letter Y and the port 306Z is denoted by the letter Z. The phrase "Y+Z" denotes that only one port Y, Z is available for matching and communication at node 306.

The problem seems insurmountable if each node 302-306 has to determine which of its neighbors are available for matching. There is an edge (illustrated by a line with arrowheads at the termini) connecting port 302Z of the node 302 and the port 306Z of node 306. Another edge exists to link the port 302X of node 302 with the port 304$\overline{X}$ of node 304 (the edge being a line with arrowheads pointing to ports 302X, 304$\overline{X}$). Another edge (another line with arrowheads at the termini) exists to link the port 304$\overline{Y}$ of node 304 and the port 306Y of the node 306. Mathematically, these edges show that there is a reaction potential between the port 302Z and the port 306Z because node 302 can input information via the port 302Z and node 306 can send information through the port 306 Z. Similarly, there is a reaction potential between node 302 and node 304 through the ports 302X, 304$\overline{X}$. The port 302X can input information which can be sent by the port 304$\overline{X}$. There is another reaction potential between node 304 and node 306 via ports 304$\overline{Y}$ and port 306Y. Information can be input through the port 306Y and output by the port 304$\overline{Y}$.

Consider a $\pi$ calculus sentence "$\overline{X}.P|X.R$" in which the term $\overline{X}$ represents the port 304$\overline{X}$ of node 304; period "." signifies a continuation of the process P when the port 304$\overline{X}$ has completed its operations; the vertical bar "|" represents operations running in parallel; the term X represents the port 302X; and the term R represents a process that runs as a continuation from the termination of the process running at the port 302X. This $\pi$ calculus sentence denotes that a first process outputs information on a port $\overline{X}$ which then continues by a process P. The first process "$\overline{X}.P$" is running in parallel with a second process "X.R," which receives information on a channel X and is then followed by the execution of the process R. To avoid a deadly embrace or a deadlock, the above $\pi$ calculus sentence should transition to a second $\pi$ calculus sentence "P|R". If it does not, a deadly embrace or a deadlock may have occurred. In other words, the two phrases across the vertical bar in the first $\pi$ calculus sentence should be able to react to continue to the second $\pi$ calculus sentence. If they do not, the system is not working properly, and as discussed above, the undesired existence of a deadlock arises.

Various embodiments of the present invention allows a solution to converge among nodes 302-306 so that a match occurs. Various embodiments of the present invention allow mutually exclusive actions denoted mathematically by phrases "Z+X", "$\overline{X}+\overline{Y}$", and "Y+Z" and their communications to remain mutually exclusive. Various embodiments of the present invention inhibit one node from committing to another node until a port on one node is willing to commit to a compatible port on the other node. If such a commitment is not possible, various embodiments of the present invention disallow a match to occur. In other words, various embodiments of the present invention allow communication between nodes to occur unless the communication is preempted by another exclusive communication on a node. Each embodiment of the present invention runs symmetrically on each node. Additionally, communication between nodes occurs asynchronously with the nodes' neighbors. The term "asynchronous" means the inclusion of a situation in which when a node outputs a communication, the node need not block and wait until the node receives a response that such a communication was successful. Each node communicates and continues in various embodiments of the present invention. This simplicity in design enhances concurrency and allows each node to have the independent ability to handle incoming communication.

Figure 3A:
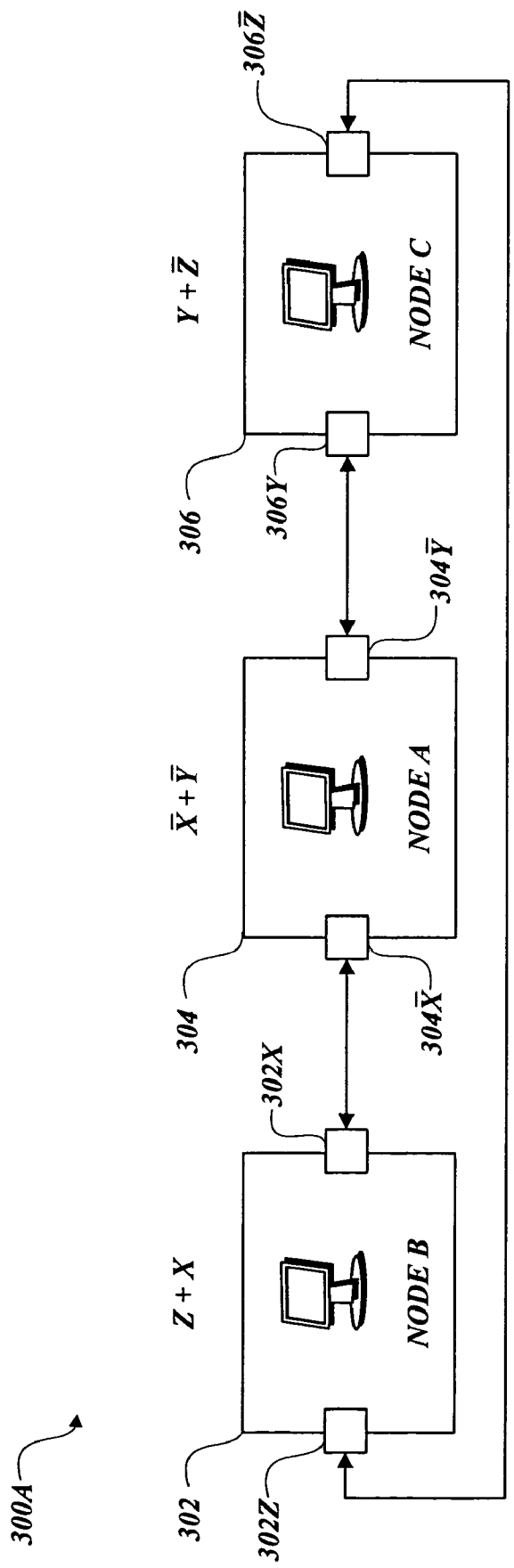
FIG. 3A is a block diagram illustrating communicable nodes in the process of matching, according to one embodiment of the present invention.
Figure 3B:
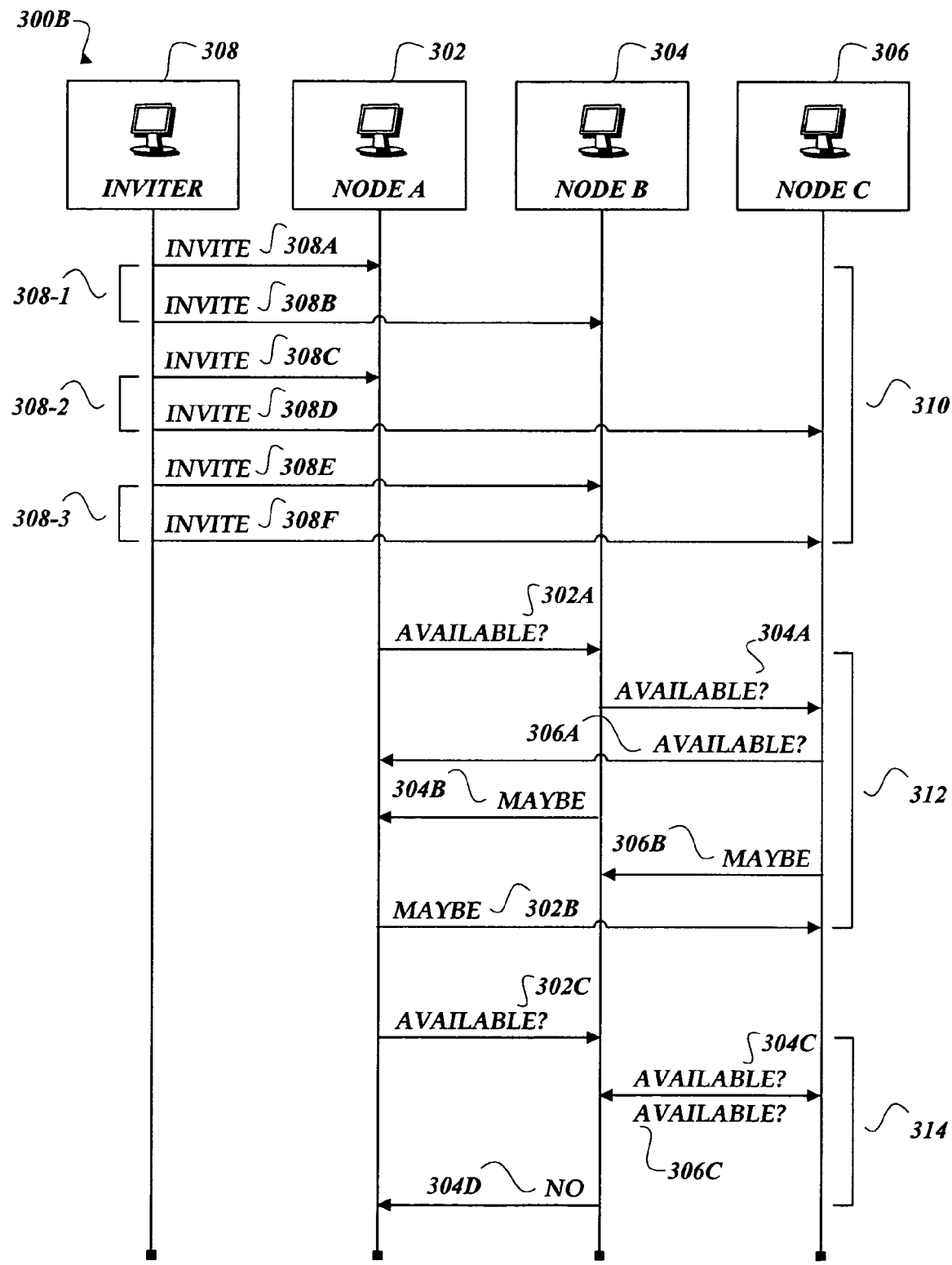
FIG. 3B is a protocol diagram illustrating an inviter and three nodes communicating with one another to determine a match, according to one embodiment of the present invention.
Figure 4A:
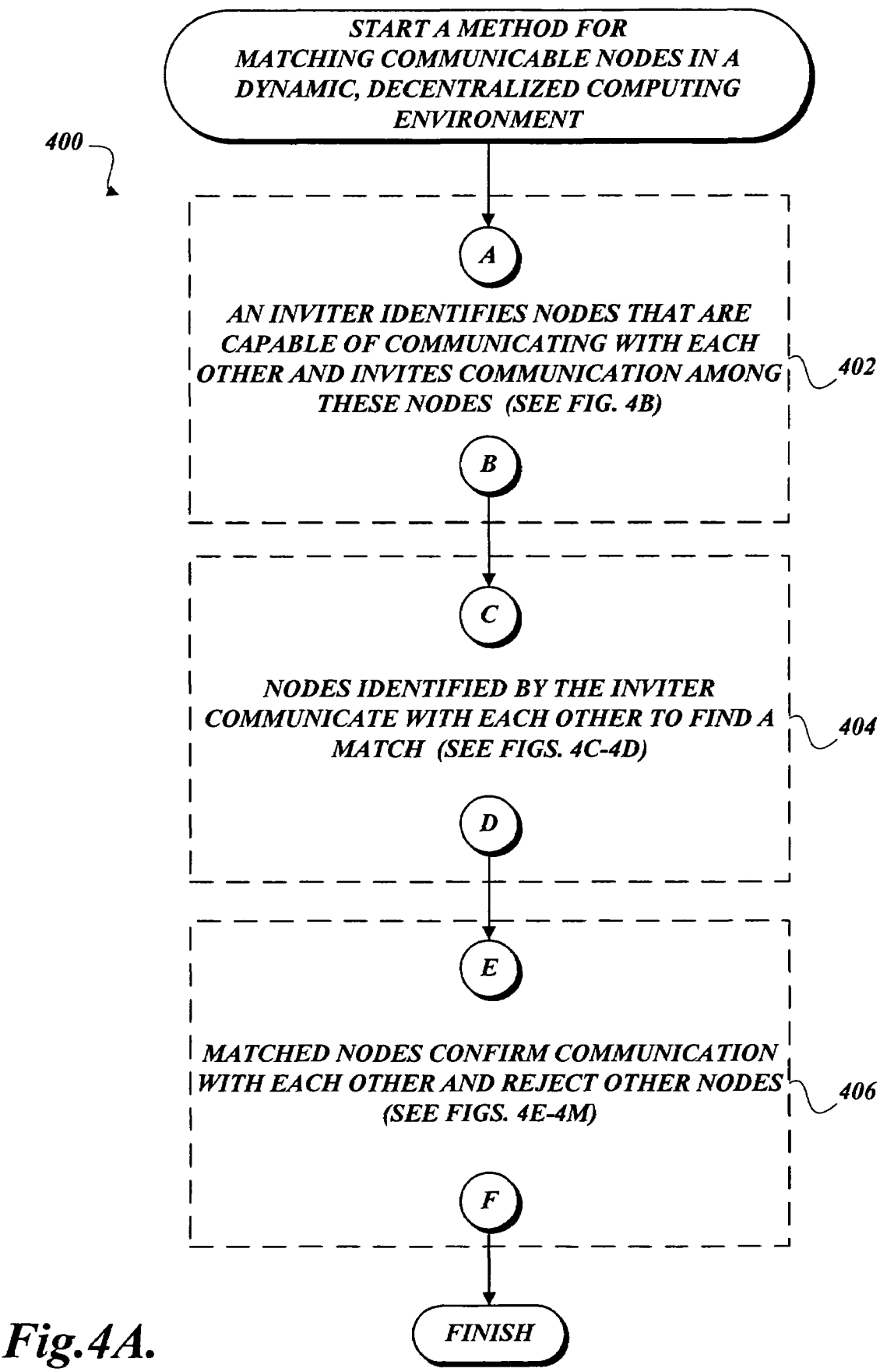
FIGS. 4A-4M are process diagrams illustrating a method for matching communicable nodes in a dynamic, decentralized computing environment.
Figure 4B:
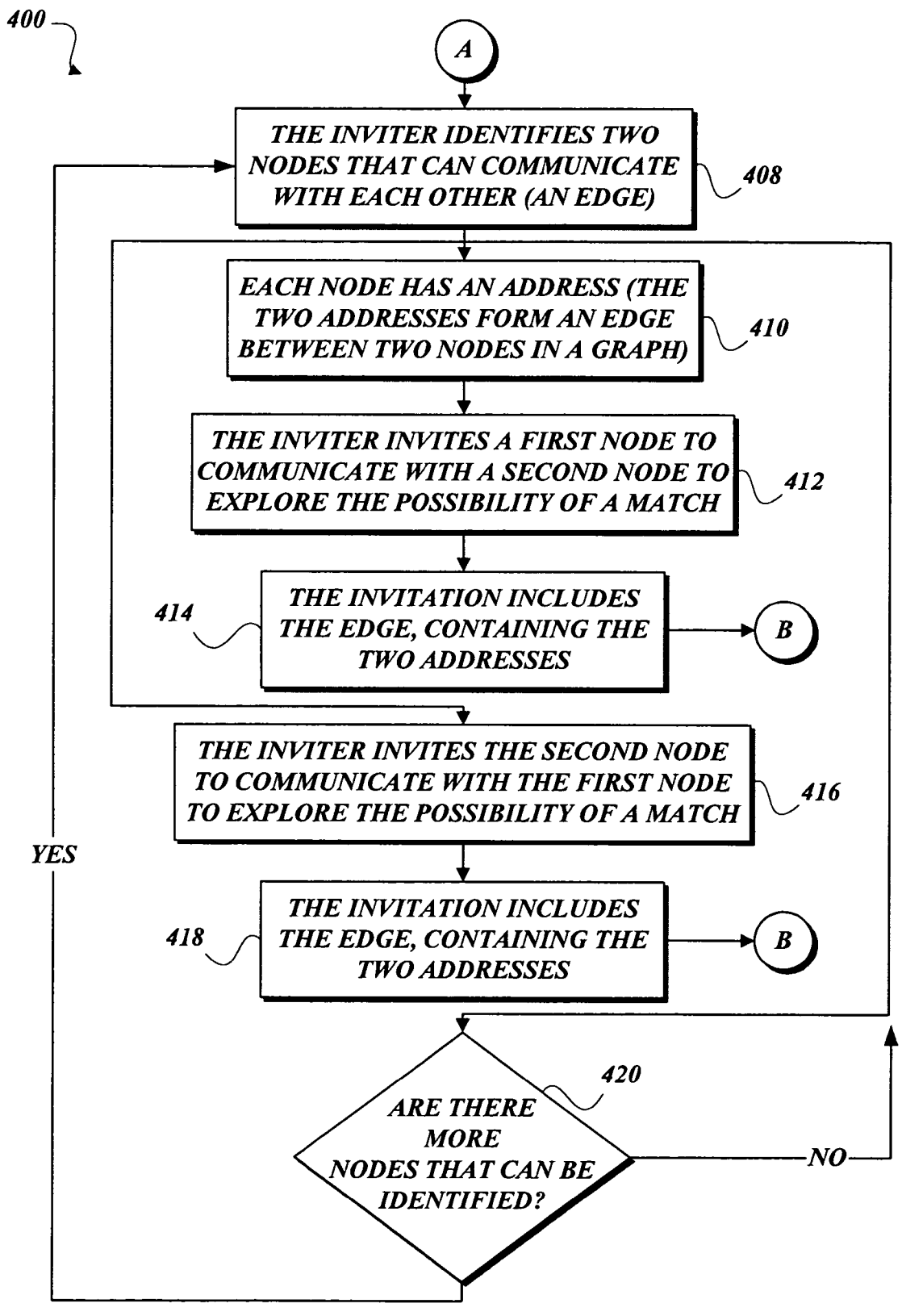
Figure 4C:
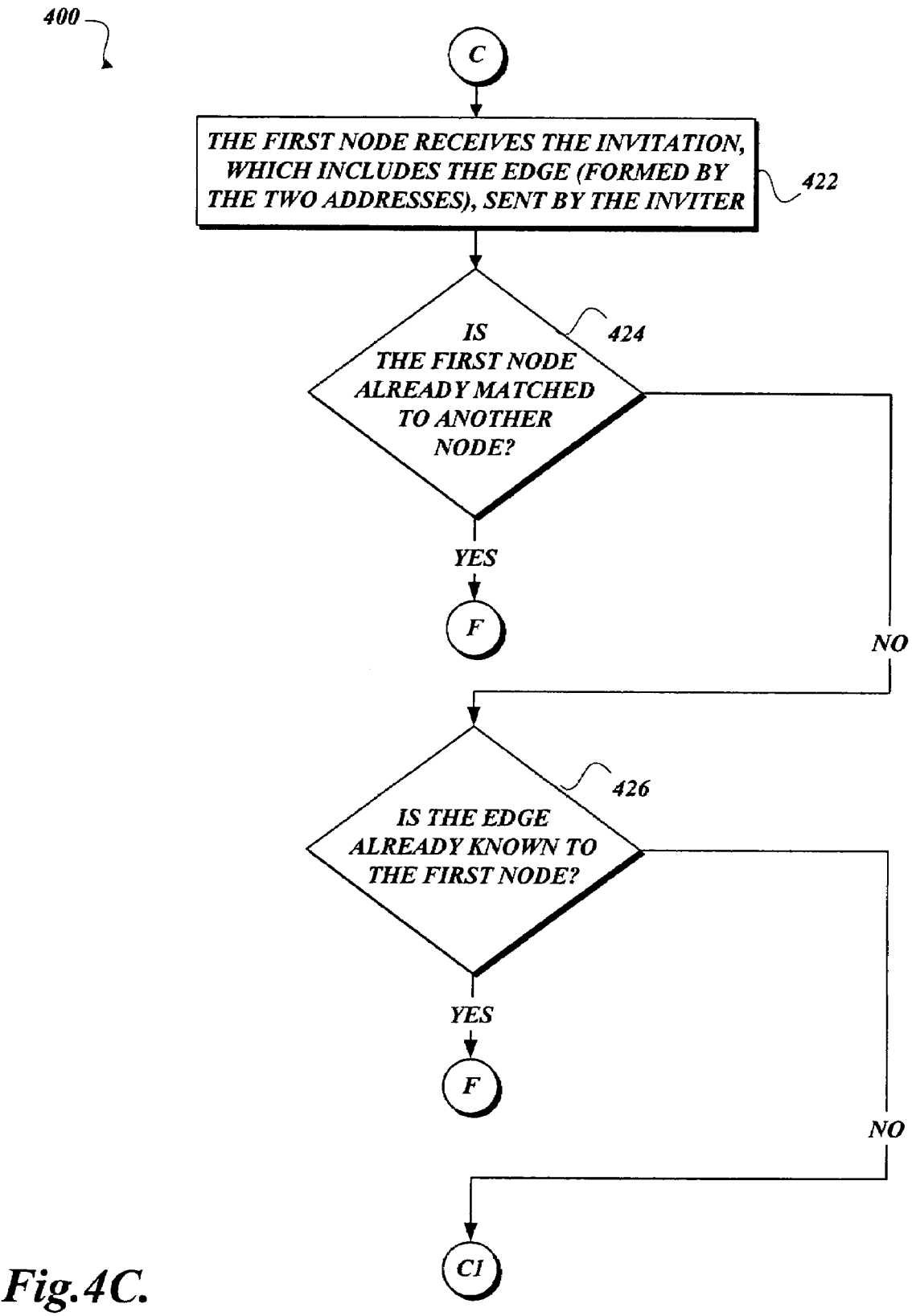
Figure 4D:
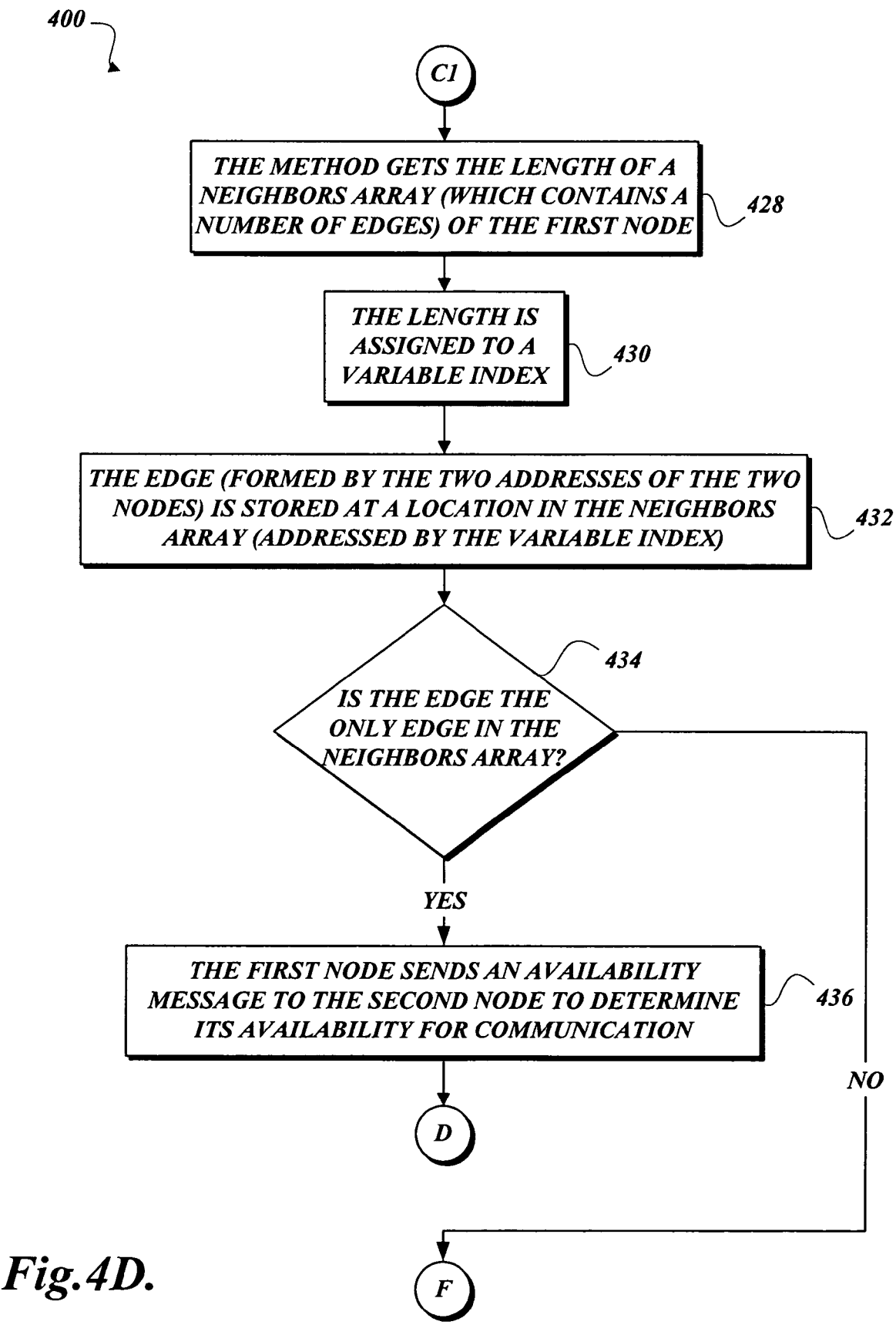
Figure 4E:
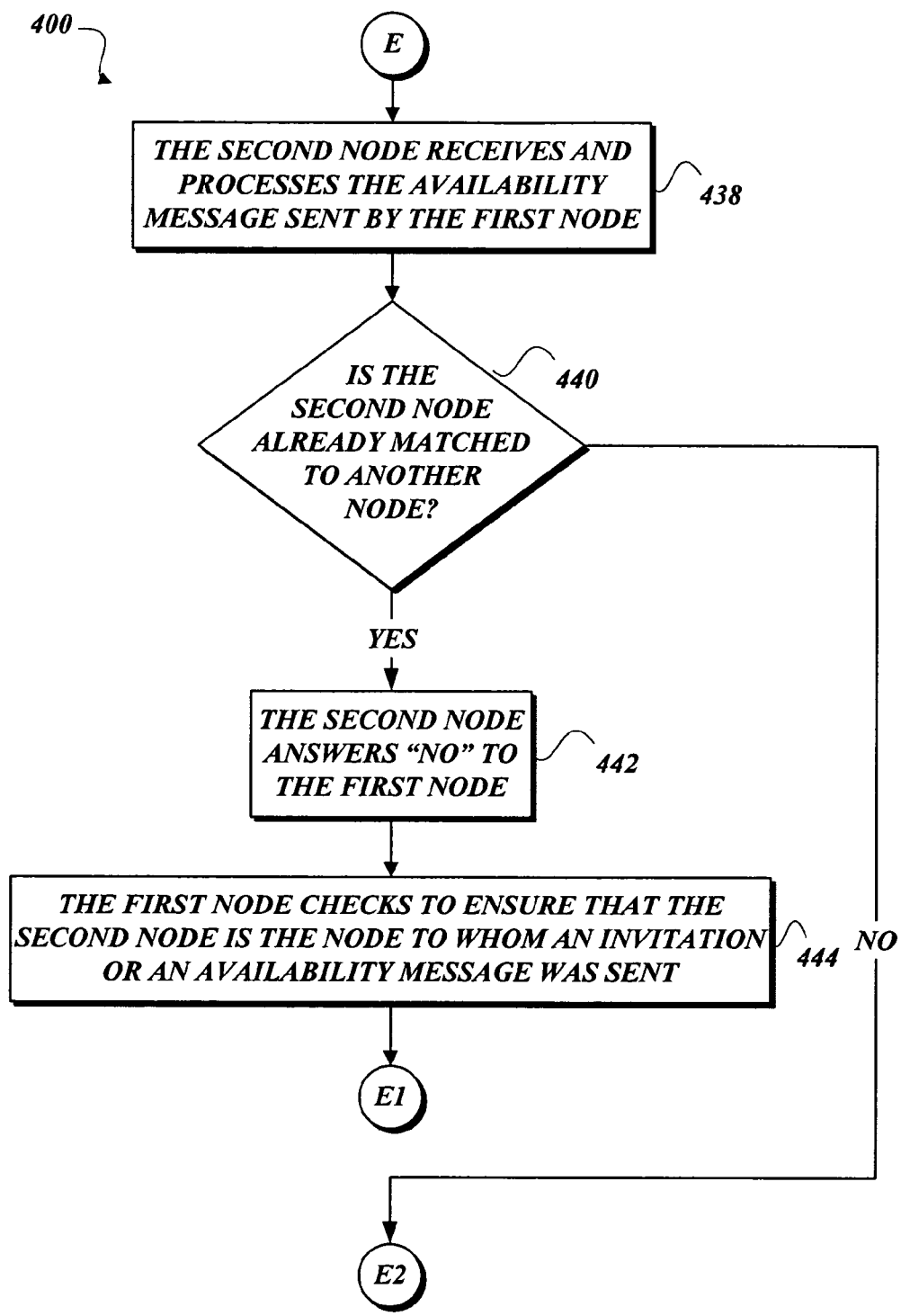
Figure 4F:
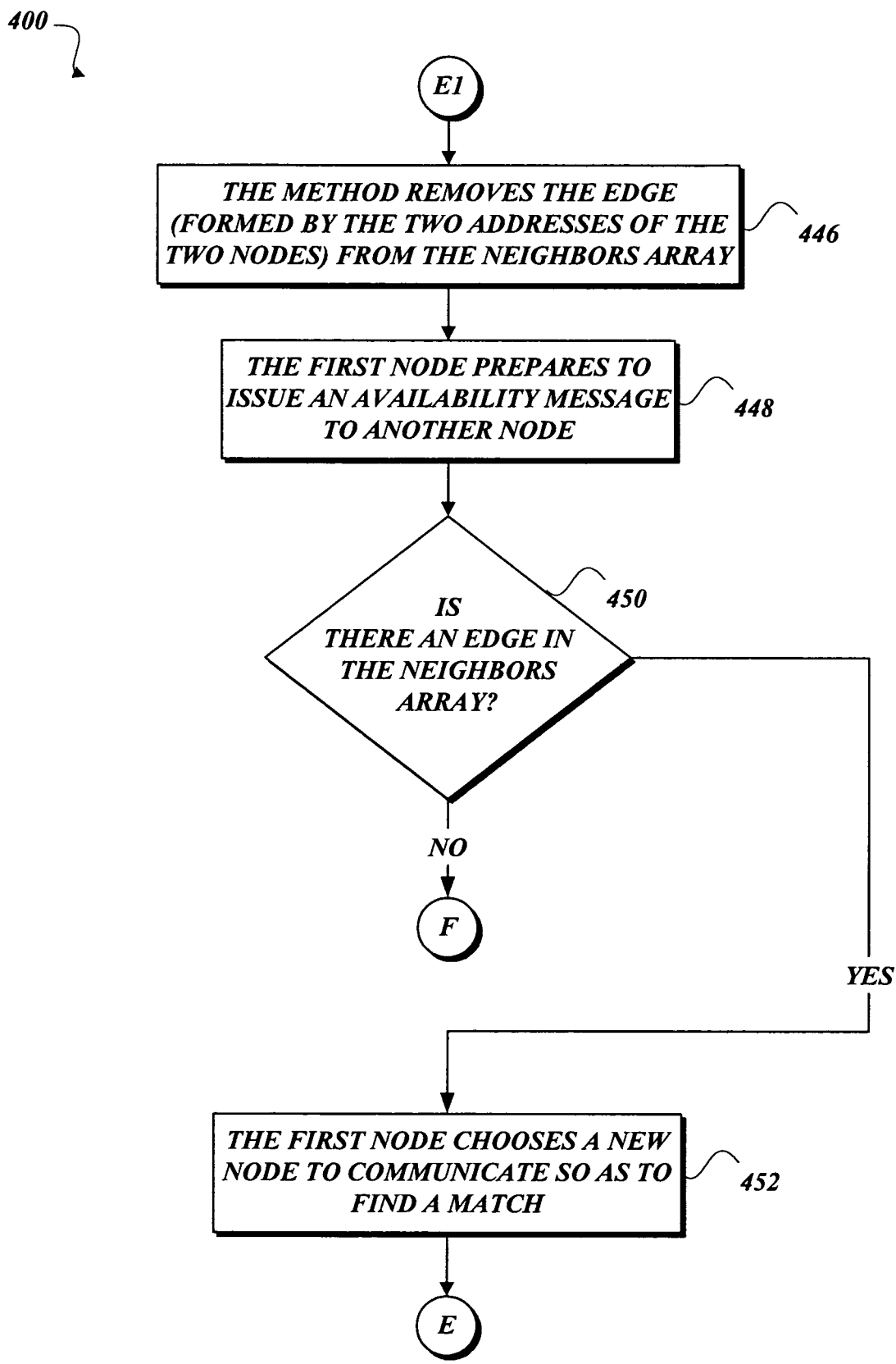
Figure 4G:
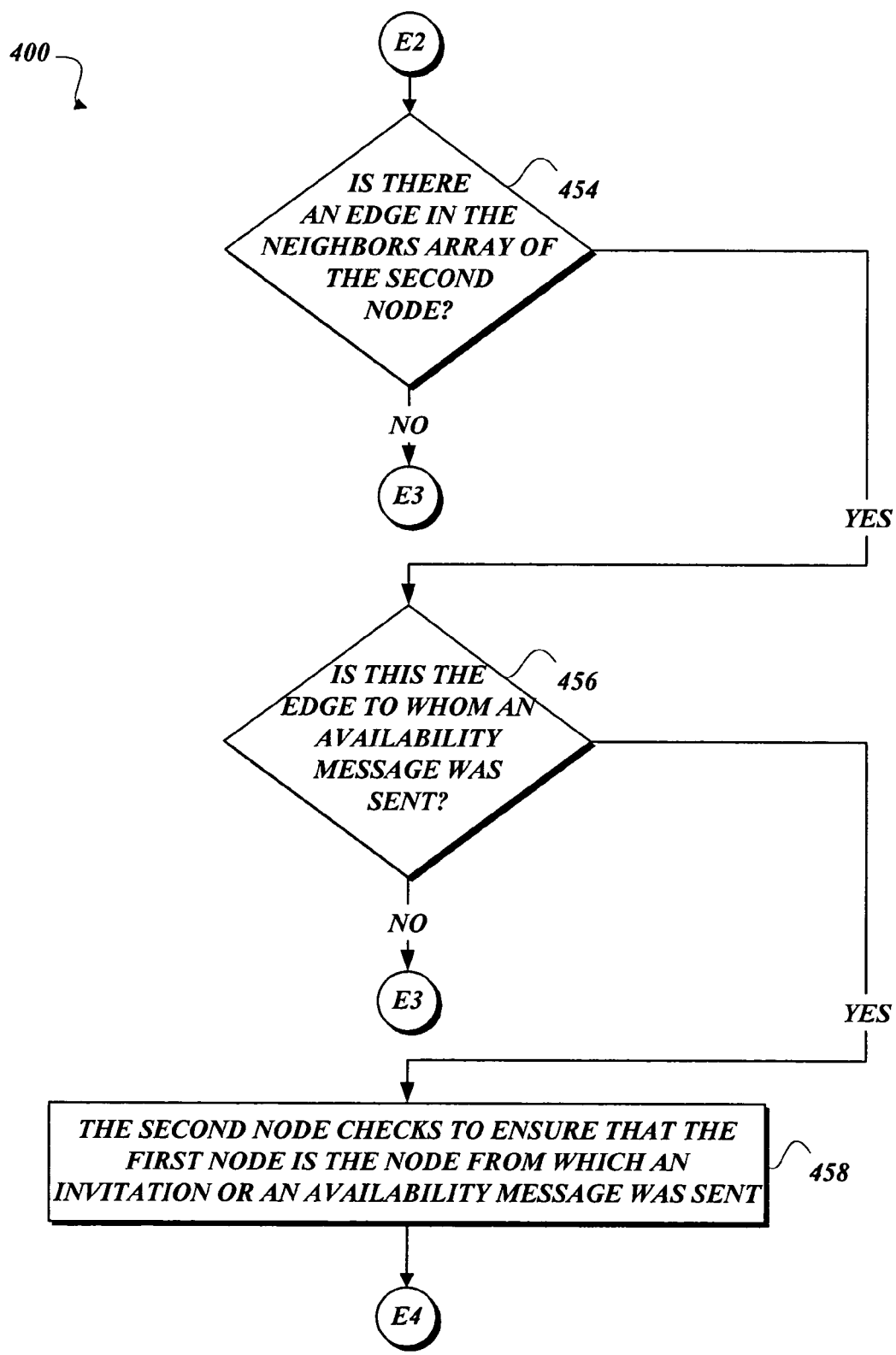
Figures 4H, 4I:
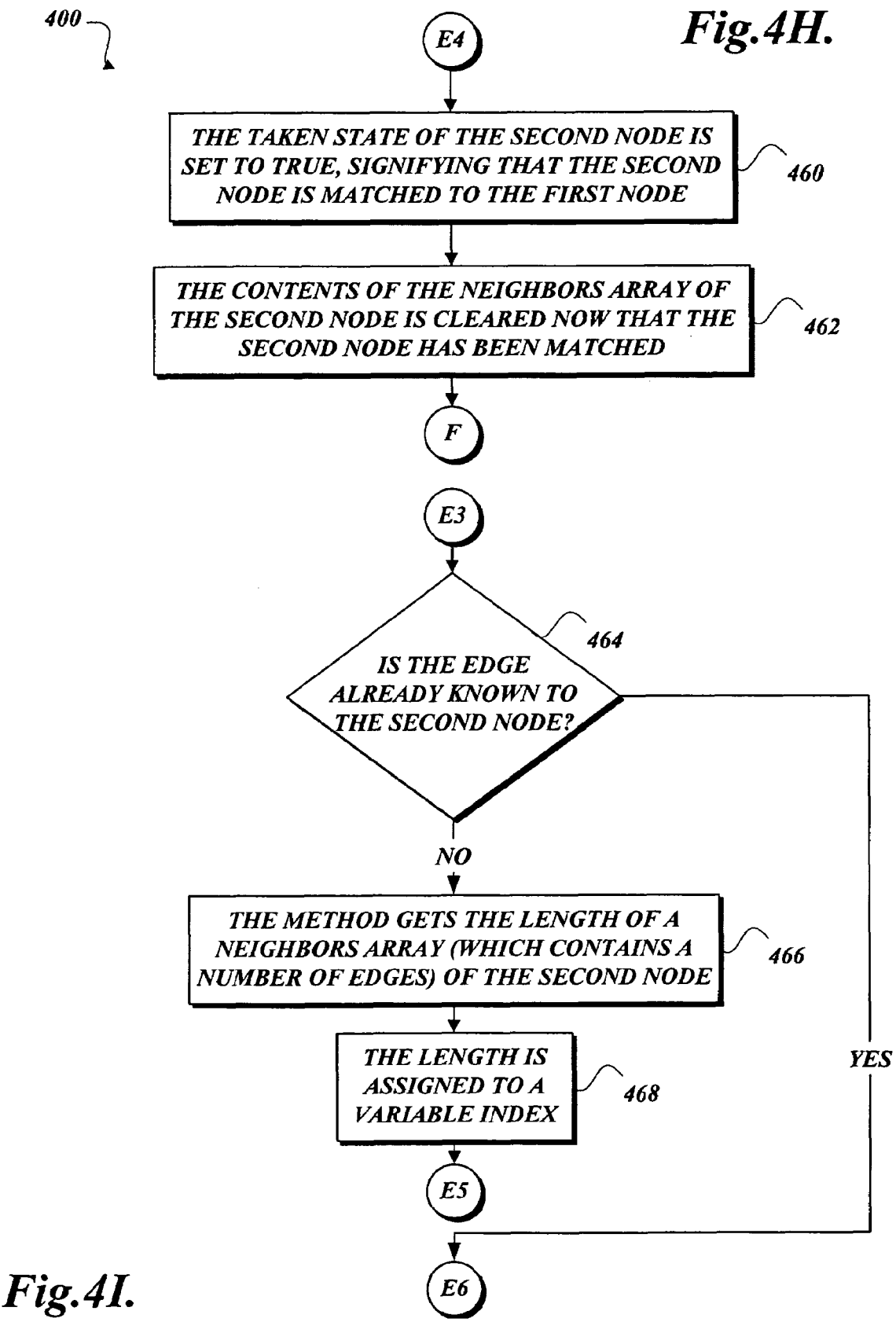
Figure 4J:
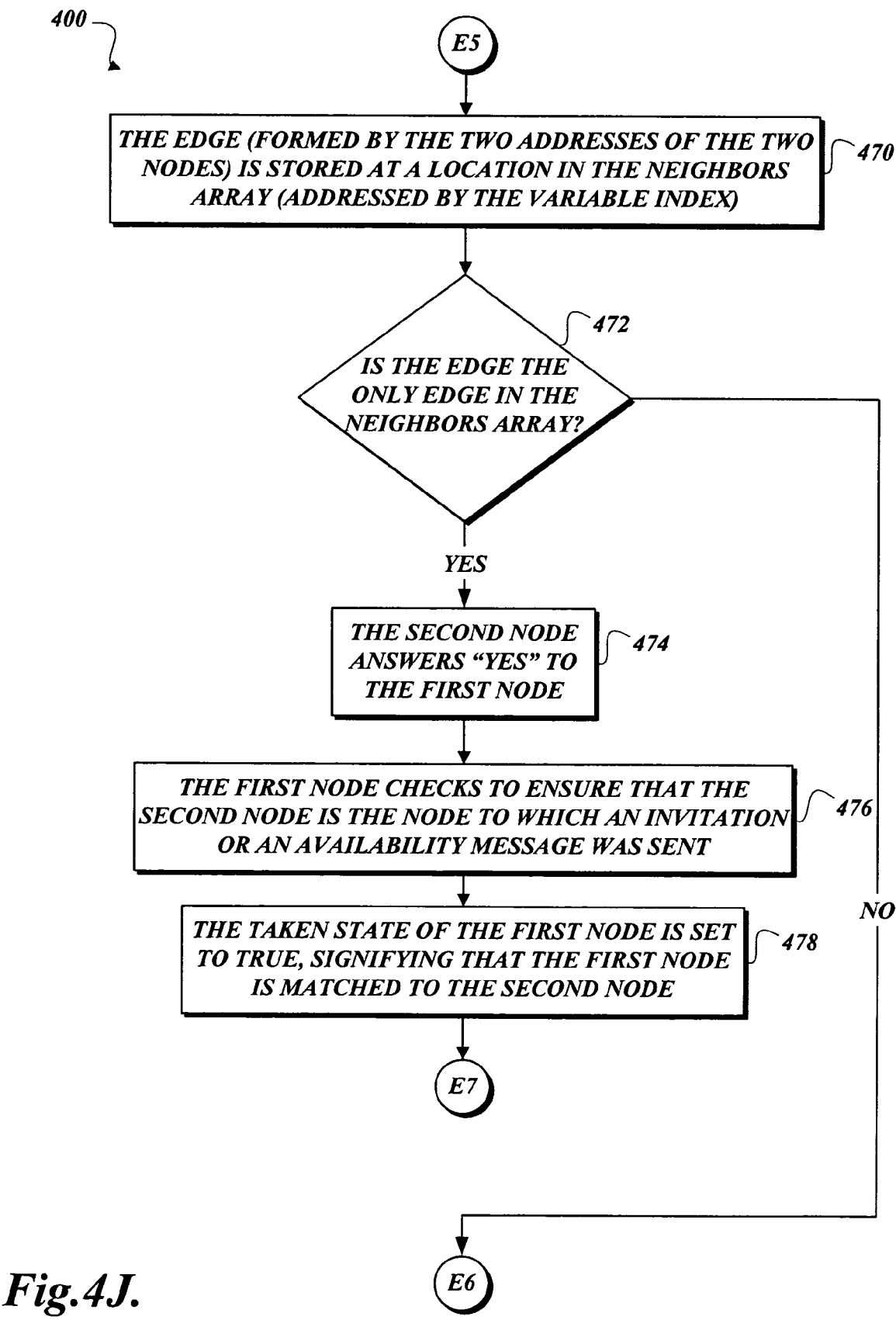
Figures 4K, 4L:
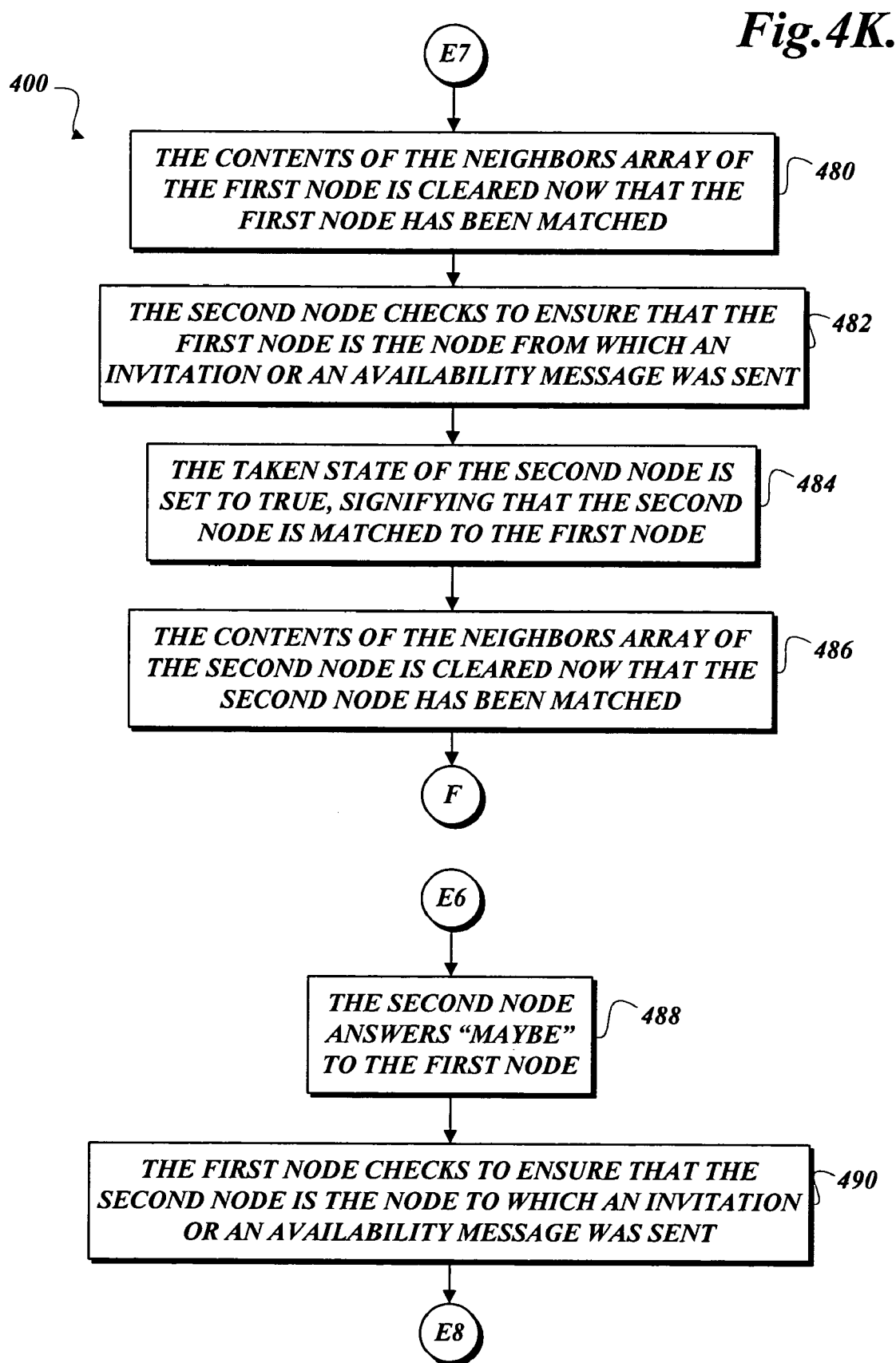
Figure 4M:
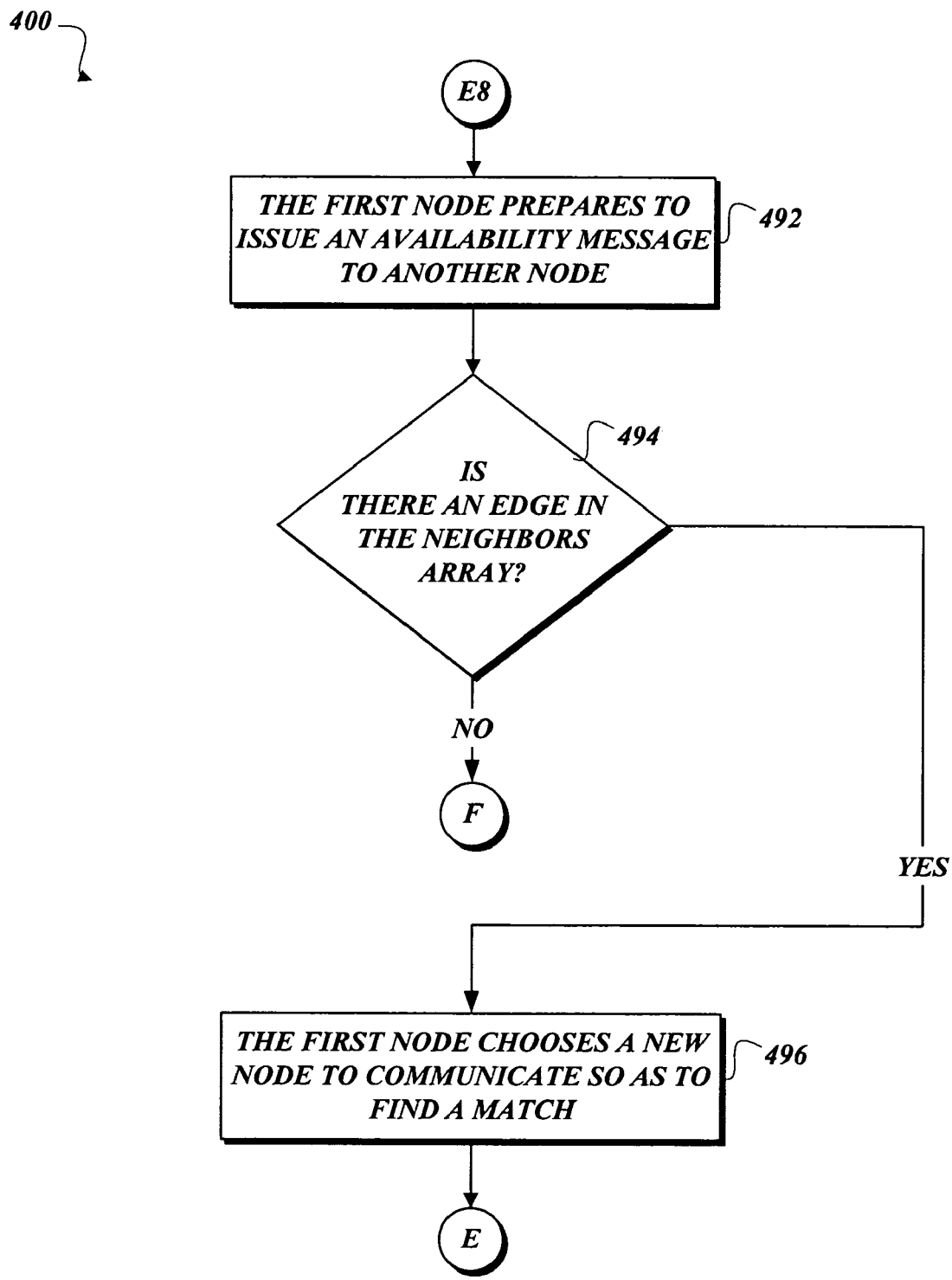

A protocol 300B for matching communicable nodes in a dynamic, decentralized computing environment is shown at FIG. 3B. The protocol 300B is used by an inviter 308 and nodes 302-306 to find a match between two nodes. The inviter 308 discovers that nodes 302-306 may communicate with one another and invite nodes 302-306 to ascertain if there is a match between two nodes among nodes 302-306. The inviter 308 sends a first set of invites 308-1, which comprises invites 308A, 308B. The invite 308A is sent to node 302 and the invite 308B is sent to node 304. Invites 308A, 308B contain addresses of nodes 302, 304 so as to allow nodes 302, 304 to communicate with one another. Another set of invites 308-2, which comprises invites 308C, 308D, is respectively sent to nodes 302, 306. Invites 308C, 308D contain addresses of nodes 302, 306 so as to allow nodes 302, 306 to communicate with one another. A further set of invites 308-3 comprises invite 308E to be sent to node 304 and invite 308F to be sent to node 306. Invites 308E, 308F allow nodes 304, 306 to communicate with one another to determine a potential match. Invites 308E, 308F contain addresses of nodes 304, 306 so as to allow nodes 304, 306 to find and communicate with one another to determine a potential match. These sets of invites 308-1, 308-2, and 308-3 form a portion 310 of the protocol 300B in which potential communicable nodes are invited to communicate with one another to find a potential match.

Another portion 312 of the protocol 300B allows nodes 302-306 to ascertain nodes that are available for a match. With the address of node 304, node 302 sends an available message 302A to node 304 to ascertain the matching availability of node 304. Node 304 also sends an available message 304A to node 306. Similarly, node 306, knowing the address of node 302, sends an available message 306A to node 302 to ascertain the matching availability of node 302. In response to the available message 302A, node 304 responds with a maybe message 304B to node 302 to let node 302 know that node 304 is potentially available. A maybe message 306B is sent by node 306 to node 304 to acknowledge the availability of node 306 as a potential match. Similarly, node 302 sends a maybe message 302B to node 306 to reveal the availability of node 302 to a potential match. Thus, in sum, portion 312 of the protocol 300B allows nodes to discover the availability of neighboring nodes.

Another portion 314 of the protocol 300B finalizes matched nodes and rejects other nodes. Again, node 302 sends an available message 302C to node 304 to inform node 304 that node 302 is still available for a match. Node 304 also sends an available message 304C to node 306. Contemporaneously, node 306 also sends an available message 306C to node 304 that it is available for a match. (In other words, messages 304C, 306C cross each other as illustrated by an edge with arrowheads at both termini of the edge.) Node 304 receives the available message 306C from node 306 and realizes that a match has occurred despite the fact that node 306 never sent a maybe message. Therefore, node 304 responds to node 302 with a no message 304D rejecting node 302 as a potential node for a match. Thus, the portion 314 of the protocol 300B concludes the discovery of available nodes and causes two nodes to commit to each other to form a match. (Node 302 preferably remains in the number of nodes available for future matches.)

FIGS. 4A-4M illustrate a method 400 for matching communicable nodes in a dynamic, decentralized computing environment. For clarity purposes, the following description of the method 400 makes reference to various elements illustrated in connection with the dynamic, decentralized computing environment 200 (FIG. 2), a network 300A (FIG. 3A), and a protocol 300B for matching communicable nodes in a dynamic, decentralized computing environment (FIG. 3B). From a start block, the method 400 proceeds to a set of method steps 402, defined between a continuation terminal ("terminal A") and an exit terminal ("terminal B"). The set of method steps 402 describes the identification of nodes by an inviter that are capable of communicating with each other and the inviter invites communication among these nodes.

From terminal A (FIG. 4B), the method 400 proceeds to block 408 where the inviter 308 identifies two nodes 302-306 that can communicate with each other (i.e., this is an edge in a graph of nodes). The method 400 from block 408 can concurrently split its execution into three programmatic paths: blocks 410, 416, and 420. At block 410, each node has an address and is discovered by the inviter 308. (The two addresses of the two nodes form an edge between two nodes in a graph.) The inviter 308 invites a first node to communicate with a second node to explore the possibility of a match. See block 412. The method 400 then proceeds to block 414 where the invitation includes the edge containing the addresses of the two nodes. The method 400 then proceeds to the exit terminal B. Concurrently, at block 416, the inviter 308 invites the second node to communicate with the first node to explore the possibility of a match. The invitation includes the edge including the two addresses of the two nodes. See block 418. The method 400 then proceeds to the exit terminal B. Concurrently, at decision block 420 a test is made to determine whether there are more nodes that can be identified. If the answer to the test at decision block 420 is YES, the method 400 loops back to block 408 where the above-identified processing steps are repeated. Otherwise, the answer to the test at decision block 420 is NO, and the method 400 loops until there are more nodes that can be identified. From the exit terminal B, the method 400 proceeds to a set of method steps 404 defined between a continuation terminal ("terminal C") and an exit terminal ("terminal D"). The set of method steps 404 describes the process by which nodes identified by the inviter 308 communicate with each other to find a match.

From terminal C (FIG. 4C), the method 400 proceeds to block 422 where the first node receives the invitation, which includes the edge (formed by the two addresses of the two nodes) sent by the inviter 308. Next, at decision block 424, a test is made to determine whether the first node has already been matched to another node. If the answer to the test at decision block 424 is YES, the method 400 proceeds to another continuation terminal ("terminal F") where the method 400 terminates execution. If the answer to the test at decision block 424 is NO, another decision block 426 is entered by the method 400 where a test is made to determine whether the edge is already known to the first node. If the answer is YES to the test at decision block 426, the method 400 proceeds to terminal F where it terminates execution. Otherwise, the answer to the test at decision block 426 is NO, and the method 400 proceeds to another continuation terminal ("terminal C1").

From terminal C1 (FIG. 4D), the method 400 proceeds to block 428 where the method 400 gets the length of a neighbor's array (which contains a number of edges) of the first node. The use of an array is discussed here for illustrative purposes only. Any suitable data structure can be used and the invention is not limited to the use of arrays. Next, at block 430, the length is assigned to a variable index. The edge (formed by the two addresses of the two nodes) is stored at a location in the neighbor's array (addressed by the variable index). See block 432. The method 400 then proceeds to decision block 434 where a test is made to determine whether the edge is the only edge in the neighbor's array. If the answer is NO to the test at decision block 434, the method 400 continues to the terminal F where it terminates execution. Otherwise, the answer to the test at decision block 434 is YES, and the method 400 proceeds to block 436 where the first node sends an availability message to the second node to determine the second node's availability for communication. The method 400 then proceeds to the exit terminal D.

From terminal D (FIG. 4A), the method 400 proceeds to a set of method steps 406 defined between a continuation terminal "terminal E") and terminal F, which is an exit terminal. The set of method steps 406 describes the process in which matched nodes confirm communication with each other and reject other nodes.

From terminal E (FIG. 4E), the method 400 proceeds to block 438 where the second node receives and processes the availability message sent by the first node. Next, at decision block 440, a test is made to determine whether the second node has already been matched to another node. If the answer to the test at decision block 440 is NO, another continuation terminal ("terminal E2") is entered by the method 400. Otherwise, the answer to the test at decision block 440 is YES, and the second node answers NO to the first node. See block 442. The method 400 then proceeds to block 444 where the first node checks to ensure that the second node is the node to whom an invitation or an availability message was sent. The method 400 then enters another continuation terminal ("terminal E1").

From terminal E1 (FIG. 4F), the method 400 proceeds to block 446 where the method 400 removes the edge (formed by the two addresses of the two nodes) from the neighbor's array. Next, at block 448, the first node prepares to issue an availability message to another node. A test is made to determine whether there is an edge in the neighbor's array. See decision block 450. If the answer to the test at decision block 450 is NO, the method 400 proceeds to the exit terminal F and terminates execution. Otherwise, the answer to the test at decision block 450 is YES, and the method 400 proceeds to block 452 where the first node chooses a new node to communicate so as to find a match. The method 400 then continues to terminal E where the above-described processing steps are repeated.

From terminal E2 (FIG. 4G), the method 400 proceeds to decision block 454 where a test is made to determine whether there is an edge in the neighbor's array of the second node. If the answer to the test at decision block 454 is NO, the method 400 proceeds to another continuation terminal ("terminal E3"). Otherwise, the answer to the test at decision block 454 is YES, and the method 400 proceeds to another decision block 456 where another test is made to determine whether this is the edge to which an availability message was sent. If the answer is NO to the test at decision block 456, the method 400 proceeds to terminal E3. Otherwise, the answer to the test at decision block 456 is YES, and the method 400 proceeds to block 458 where the second node checks to ensure that the first node is the node from which an invitation or an availability message was sent. The method 400 then continues to another continuation terminal ("terminal E4").

From terminal E4 (FIG. 4H), the method 400 proceeds to block 460 where the taken state of a second node is set to TRUE, signifying that the second node is matched to the first node. Next, at block 462, the contents of the neighbor's array of the second node is cleared now that the second node has been matched. The method 400 then proceeds to terminal F where it terminates execution.

From terminal E3, the method 400 proceeds to decision block 464 where a test is made to determine whether the edge is already known to the second node. If the answer to the test at decision block 464 is YES, the method 400 proceeds to another continuation terminal ("terminal E6"). Otherwise, the answer to the test at decision block 464 is NO, and the method 400 gets the length of a neighbor's array (which contains a number of edges) of the second node. See block 466. Next, at block 468, the length is assigned to a variable index. The method 400 then continues to another continuation terminal ("terminal E5").

From terminal E5 (FIG. 4J), the method 400 proceeds to block 470 where the edge (formed by the two addresses of the two nodes) is stored at a location in the neighbor's array (addressed by the variable index). Next, at decision block 472, a test is made to determine whether the edge is the only edge in the neighbor's array. If the answer is NO to the test at decision block 472, the method 400 proceeds to terminal E6. Otherwise, the answer to the test at decision block 472 is YES, and the second node response with a YES to the first node. See block 474. The method 400 then continues to block 476 where the first node checks to ensure that the second node is the node to which an invitation or an availability message was sent. Next, at block 478, the taken state of the first node is set to TRUE, signifying that the first node is matched to the second node. The method 400 then proceeds to another continuation terminal ("terminal E7").

From terminal E7 (FIG. 4K), the method 400 proceeds to block 480 where the contents of the neighbor's array of the first node is cleared now that the first node has been matched. Next, at block 482, the second node checks to ensure that the first node is a node from which an invitation or an availability message was sent. The taken state of the second node is set to TRUE, signifying that the second node is matched to the first node. See block 484. The contents of the neighbor's array of the second node is cleared now that the second node has been matched. See block 486. The method 400 then continues to the exit terminal F where it terminates execution.

From terminal E6 (FIG. 4L), the method 400 proceeds to block 488 where the second node answers MAYBE to the first node. Next, at block 490, the first node checks to ensure that the second node is the node to which an invitation or an availability message was sent. The method 400 then continues to another continuation terminal ("terminal E8").

From terminal E8 (FIG. 4M), the method 400 proceeds to block 492 where the first node prepares to issue an availability message to another node. Next, at decision block 494, a test is made to determine whether there is an edge in the neighbor's array. If the answer to the test at decision block 494 is NO, the method 400 proceeds to the exit terminal F and terminates execution. Otherwise, the answer to the test at decision block 494 is YES, and the first node chooses a new node to communicate so as to find a match. See block 496. The method 400 then continues to terminal E where the above-described processing steps are repeated.

Computer-readable media as construed herein includes removable/nonremovable, volatile/nonvolatile computer storage media. Volatile computer-readable storage media includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlinik DRAM (SLDRAM), and direct Rambus RAM (DRRAM). Nonvolatile computer-readable storage media includes, but is not limited to, devices like a magnetic disk drive, floppy disk drive, tape drive, Jaz drive, Zip drive, LS-100 drive, flash memory card, or memory stick. In addition, nonvolatile computer storage media can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM).

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A decentralized computing environment, comprising:
   a number of nodes, wherein
      each node in the number of nodes is capable of being a neighboring node to other nodes in the number of nodes,
      each node is capable of querying the availability of neighboring nodes for a match, wherein the match is formed when a first node queries the availability of a second node and the second node queries the availability of the first node, wherein if the match is formed,
      a taken state of both nodes is set to true and
      the contents of each node's neighbors array or alternative data structure is cleared, wherein the contents of each neighbors array and alternative data structure comprise information relating to the corresponding node's set of neighbors.

2. The decentralized computing environment of claim 1, wherein another match is formed when the first node queries the availability of the second node and the second node responds with a yes message.

3. The decentralized computing environment of claim 1, wherein no match is formed when the first node queries the availability of the second node and the second node responds with a no message.

4. The decentralized computing environment of claim 1, further comprising an inviter that invites the number of nodes to communicate to find a match.

5. The decentralized computing environment of claim 1, further comprising a new node that is dynamically introduced to the decentralized computing environment, wherein the new node is capable of querying the availability of neighboring nodes for a match.

6. A protocol for matching communicable nodes in a dynamic, decentralized computing environment, the protocol comprising:

employing a processor to execute computer readable instructions stored in a computer readable medium to perform the following acts:
  identifying two nodes that are capable of communicating with each other;
  inviting a first node of the two nodes to communicate with a second node of the two nodes to find a match, wherein the invitation includes an edge containing an address of the first node and an address of the second node;
  inviting the second node to communicate with the first node to find the match, wherein the invitation includes the edge containing the address of the first node and the address of the second node; and
  forming a match between the first node and the second node, comprising:
    sending another availability message from the first node to the second node,
    replying with an availability message or a yes message,
    setting a taken state of the second node to true and
    clearing the contents of the second node's neighbors array or alternative data structure of information relating to the node's set of neighbors.

7. The protocol of claim 6, wherein the first node and the second node are neighbors.

8. The protocol of claim 6, further comprising terminating the protocol if the first node has already been matched to another node.

9. The protocol of claim 6, further comprising replying with a no message if the second node has already been matched to another node.

10. The protocol of claim 6, further comprising setting a taken state of the first node to true.

11. A computer-readable medium having stored thereon computer-executable instructions for performing a method for matching communicable nodes in a dynamic, decentralized computing environment, the method comprising:
  discovering two nodes, wherein each node has an address and addresses from the two nodes form an edge;
  inviting the two nodes to communicate to find a match, comprising:
    inviting the first node to communicate with the second node, wherein the invitation includes information about the edge; and
    inviting the second node to communicate with the first node, wherein the invitation includes information about the edge;
  communicating to discover a matching availability of the two nodes, wherein each node sends availability messages; and
  forming a match, comprising
    sending another availability message from a first node to a second node,
    sending an availability message or a yes message from the second node to the first node,
    setting a taken state of the second node to true and
    removing all information related to other neighboring nodes from the second node's neighbors array or alternative data structure.

12. The computer-readable medium of claim 11, the method further comprising discovering the two nodes, wherein the first node and the second node are neighbors.

13. The computer-readable medium of claim 11, the method further comprising terminating the method if the first node has already been matched to another node.

14. The computer-readable medium of claim 11, the method further comprising receiving the availability message from the first node, and answering with a no message if the second node has already been matched to another node.

15. The computer-readable medium of claim 11, the method further comprising setting a taken state of the first node to true.

* * * * *